Aug. 18, 1964   F. T. IRGENS   3,144,890
CHAIN SAW SPROCKET
Filed Jan. 12, 1962
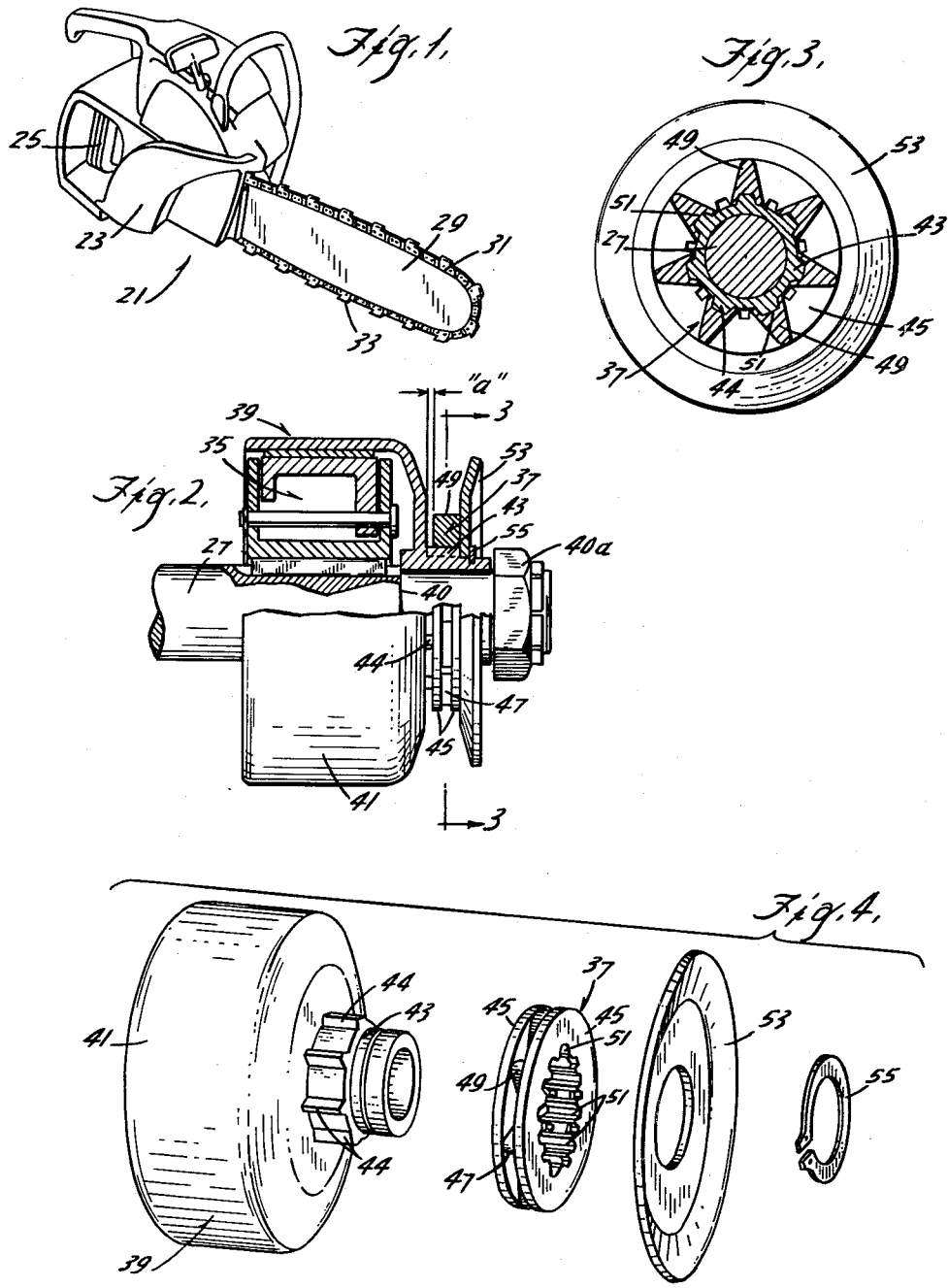
INVENTOR.
FINN T. IRGENS
BY
Wheeler, Wheeler & Wheeler
ATTORNEYS.

United States Patent Office 3,144,890
Patented Aug. 18, 1964

3,144,890
CHAIN SAW SPROCKET
Finn T. Irgens, Milwaukee, Wis., assignor to Outboard Marine Corporation, Waukegan, Ill., a corporation of Delaware
Filed Jan. 12, 1962, Ser. No. 165,733
7 Claims. (Cl. 143—32)

The invention relates generally to chain saws. More particularly, the invention relates to arrangements for powering and driving the saw chain.

In general, the invention has for its object the provision of an improved chain saw. More specifically, the invention has for an object the provision of an arrangement in a chain saw whereby the sprocket which drives the saw chain is mounted so that, when the saw chain is driven, the sprocket is free to move axially, thereby permitting the sprocket to accommodate side sway of the saw chain. In addition, the free movability of the sprocket linearly along its axis of rotation permits self-alignment of the sprocket with the saw chain guide slot in the associated cutter bar, thereby also avoiding excessive wear which commonly results when the sprocket and guide slot are misaligned. In the preferred embodiment, the chain sprocket is keyed to the driven member of a centrifugal clutch, thus achieving the advantage of a unitary clutch and sprocket assembly, while permitting self-adjusting, axial movement of the sprocket, regardless of whether the clutch member is, or is not, engaged with the drive motor.

Other objects of the invention will become apparent by reference to the following description and the accompanying drawings of one embodiment of the invention.

In the drawings:

FIGURE 1 is a perspective view of a chain saw embodying the invention;

FIGURE 2 is an enlarged elevational view, partially in section, of the arrangement for driving the chain sprocket; which arrangement incorporates various of the features of the invention;

FIGURE 3 is a sectional view taken along the line 3—3 of FIGURE 2; and

FIGURE 4 is an exploded diagrammatic view of the assembly of the chain sprocket and the clutch member.

The chain saw 21 shown in FIGURE 1 includes a housing 23 internally supporting a drive motor 25 which, in the instant case, is a two stroke internal combustion engine, and which incorporates an outwardly extending output rotor or drive shaft 27 (see FIGURE 3). Also included in the construction shown in FIGURE 1 is an elongated cutter bar 29 which is supported by the housing 23 and which includes a peripheral slot or track 31 in which the saw chain 33 is guided.

The saw chain 33 is driven through suitable clutch means 35 (see FIGURE 2) by a chain sprocket 37. While various types of clutches can be employed, the disclosed construction utilizes a centrifugal type clutch which, when the drive shaft 27 attains sufficient speed, engages a clutch member or element 39 to cause rotation of the clutch member.

The clutch member 39, as shown in FIGURE 2, includes a hollow cylindrical shell or drum part 41 and a hub part 43 which extends from the drum part and is journaled on the drive shaft 27, whereby the drive shaft is rotatably operable through the clutch member 39 when the clutch means is disengaged. Various means, such as engagement between a shoulder 40 and a nut 40a, can be used to retain the clutch member 39 on the drive shaft 27. The clutch member 39 carries means mounting the sprocket 37 for rotation therewith and for axially slideable movement relative thereto. In this regard the sprocket mounting means includes means defining a path having a minimum length greater than the width of the sprocket and along which the sprocket is free for lengthwise sliding movement relative to the clutch member, and means limiting the length of the path to retain the sprocket on the clutch member. In the illustrated construction, the sprocket mounting means includes formation of the hub part 43 with a splined formation 44 which forms a path for sliding movement of the sprocket 37 and which extends parallel to the axis of rotation of the clutch member for co-operation with the chain sprocket 37, as will be explained.

Chain sprocket 37 can be fabricated in various ways to include a pair of outer washers, ring portions, or rings 45 and a connecting spacer portion 47 having an outer cross sectional outline in the form of a sprocket. In the disclosed construction, the sprocket formation includes seven teeth 49. As is well known, the teeth 49 drivingly engage the center links of the saw chain 33 to drive the saw chain around the cutter bar 29. The outer peripheries of the washers 45 provide bearing surfaces for the side links of the saw chain 33 during the travel around the chain sprocket 37.

The chain sprocket 37 is centrally apertured, as seen best in FIGURE 3, to provide a splined configuration 51 which mates with the splined formation 44 on the hub part 43. As a result, when the chain sprocket 37 is mounted on the hub part 43 of the clutch member 39, the chain sprocket rotates with the clutch member 39. However, due to the splined connection between the clutch member 39 and the chain sprocket 37, the chain sprocket is free to move axially along the length of the hub along a path having a minimum length greater than the width of the sprocket. In the disclosed construction, the length of the path permits lengthwise axial sliding movement of the sprocket 37 relative to the clutch member 39 through a limited distance indicated by the dimension "a" in FIGURE 2, even when the clutch member 39 is drivingly engaged with the motor 25, to accommodate lateral swing or sway of the saw chain 33 and to avoid misalignment with the guide slot 31 in the cutter bar 29.

In the disclosed construction, the chain sprocket 37 is an alloy steel casting which has been centrally broached to provide the desired splined configuration 51.

Various means can be provided for limiting the length of the path to retain the chain sprocket 37 on the hub part 43. In the disclosed construction a washer 53 is utilized, together with a snap fastener 55 engaging the outer end of the hub part 43. The snap fastener 55 is engaged with the hub part 43 at such distance from the shell part 41 of the clutch member 39 to float the chain sprocket 37 on the hub part 43 for free, limited shifting of the chain sprocket along the splined formation of the hub part through the dimension indicated at "a" in FIGURE 2.

While the disclosed construction utilizes a direct drive between the motor 25 and the chain sprocket 37, various of the features of the invention can be obtained with drives incorporating a speed reduction feature. Moreover, while the disclosed chain sprocket is freely movable axially of the drive shaft 27, various other arrangements can be employed, so long as the chain sprocket 37 is freely linearly movable along its axis of rotation so as to provide for alignment with the guide slot 31 in the cutter bar 29 and to accommodate side sway of the saw chain 33.

Various of the features of the invention are set forth in the following claims.

What is claimed is:

1. The combination in a chain saw of
    an engine having an output shaft,
    a clutch member drivingly engageable with said shaft to effect rotation of said clutch member, means for releasably drivingly engaging said clutch member to said shaft, a chain sprocket keyed to said clutch member for rotation therewith and for self-adjusting axial movement, and means on said sprocket and on said clutch member limiting said self-adjusting axial movement of said sprocket relative to said clutch member.

2. The combination as set forth in claim 1 wherein said clutch member includes a part which is carried on said output shaft and which includes a splined formation and said chain sprocket is carried on said part and includes a splined configuration which mates with said splined formation to permit linear movement along the axis of sprocket rotation while affording rotation of said sprocket incident to rotation of said clutch member.

3. The combination in a chain saw of an engine having an output shaft, a clutch element carried by said shaft for rotation therewith incident to driving connection with said shaft, means for releasably drivingly connecting said clutch element to said shaft, a chain sprocket, and means carrying said chain sprocket on said clutch element for co-axial rotation therewith and including means permitting free movement of said chain sprocket relative to said clutch member in directions axially of said co-axial rotation and means limiting said movement of said sprocket relative to said clutch member.

4. The combination set forth in claim 3 in which said means carrying said chain sprocket on said clutch element comprises a splined formation on said clutch element and a mating splined configuration on said chain sprocket.

5. The combination in a chain saw of an engine having an output shaft, a clutch member drivingly engageable with said shaft to effect rotation of said clutch member, means for releasably drivingly engaging said clutch member to said shaft, a chain saw sprocket, means on said clutch member mounting said saw chain sprocket and including means allowing reciprocal movement of said sprocket relative to said clutch member along the axis of rotation of said clutch member, said sprocket mounting means also including means for preventing separation of said sprocket from said clutch member, notwithstanding said reciprocal movement.

6. The combination in a chain saw of an engine, a rotatable member driven by said engine, a saw chain sprocket, and means carried by said rotatable member mounting said sprocket for rotation with said member, said sprocket mounting means including means defining a path having a minimum length greater than the width of said sprocket and along which said sprocket is free for lengthwise sliding movement relative to said member, and said sprocket mounting means also including means limiting the length of said path to retain said sprocket on said member.

7. The combination in a chain saw of an engine, a rotatable member driven by said engine, a saw chain sprocket, means carried by said rotatable member mounting said sprocket for rotation with said member, said sprocket mounting means including means defining a path having a minimum length greater than the width of said sprocket and along which said sprocket is free for lengthwise sliding movement relative to said member, and said sprocket mounting means also including means limiting the length of said path to retain said sprocket on said member, an elongated cutter bar connected to said engine and projecting in outwardly extending relation therefrom, said cutter bar including means for guiding the travel of a saw chain thereon, and a saw chain trained around said sprocket and engaged in said saw chain guiding means on said cutter bar.

References Cited in the file of this patent

UNITED STATES PATENTS

| | | |
|---|---|---|
| 2,525,110 | Adair | Oct. 10, 1950 |
| 2,883,000 | Mattson | Apr. 21, 1959 |
| 2,992,660 | Merz | July 18, 1961 |
| 3,045,502 | Carlton | July 24, 1962 |